(12) United States Patent
Paul et al.

(10) Patent No.: US 12,151,293 B2
(45) Date of Patent: Nov. 26, 2024

(54) COMBINATION TOOL AS WELL AS DRILLS FOR SUCH A DRILLING/CHAMFERING TOOL

(71) Applicant: Kennametal Inc., Latrobe, PA (US)

(72) Inventors: Marcus Paul, Nuremberg (DE); Bernhard Eckl, Rottendorf (DE); Herbert Rudolf Kauper, Rosstal (DE)

(73) Assignee: KENNAMETAL INC., Latrobe, PA (US)

( * ) Notice: Subject to any disclaimer, the term of this patent is extended or adjusted under 35 U.S.C. 154(b) by 541 days.

(21) Appl. No.: 17/439,546

(22) PCT Filed: Mar. 13, 2020

(86) PCT No.: PCT/US2020/022647
§ 371 (c)(1),
(2) Date: Sep. 15, 2021

(87) PCT Pub. No.: WO2020/190726
PCT Pub. Date: Sep. 24, 2020

(65) Prior Publication Data
US 2022/0184717 A1 Jun. 16, 2022

(30) Foreign Application Priority Data
Mar. 15, 2019 (DE) ............ 102019203531.0

(51) Int. Cl.
*B23B 51/08* (2006.01)
*B23B 51/00* (2006.01)
*B23B 51/10* (2006.01)

(52) U.S. Cl.
CPC ........ *B23B 51/108* (2013.01); *B23B 51/0007* (2022.01); *B23B 2251/043* (2013.01)

(58) Field of Classification Search
CPC ..... B23B 51/10; B23B 51/107; B23B 51/108; B23B 51/1085; B23B 51/08; B23B 51/0007; B23B 2251/043
(Continued)

(56) References Cited

U.S. PATENT DOCUMENTS 1,398,779 A * 11/1921 Hayden ................. B23B 49/005
408/192
4,353,670 A 10/1982 Jorgensen
(Continued)

FOREIGN PATENT DOCUMENTS

CN 1816408 A 8/2006
CN 101068644 A 11/2007
(Continued)

OTHER PUBLICATIONS

Drozda et al.; "Tool and Manufacturing Engineers Handbook"; 1983; Society of Manufacturing Engineers, vol. 1, Fourth Edition, Chapter 9, p. 9-14 (Year: 1983).*
(Continued)

*Primary Examiner* — Nicole N Ramos
(74) *Attorney, Agent, or Firm* — Christopher J. Owens

(57) ABSTRACT

The combination tool (2), in particular a drilling/chamfering tool, comprises a drill (6) extending in the longitudinal direction (4) with a clamping sleeve (8), which is designed to receive the drill (6) and fasten the drill (6) at a variable length and which has a holding seat (38) for a cutting insert (12). The drill (6) comprises a cutting region (22) provided with grooves (14), wherein the grooves (14) extend helically and are formed between two grooves (14) drill backs (18). At least one of the drill backs (18) is partially flattened to form an adjustment surface (16) for the cutting insert (12), wherein the adjustment surface (16) extends helically. As a
(Continued)

result, a length adjustment over a large length range is made possible independently of the twist angle (γ).

13 Claims, 2 Drawing Sheets

(58) Field of Classification Search
USPC .............................. 408/189, 225, 118, 145
See application file for complete search history.

(56) References Cited

U.S. PATENT DOCUMENTS

| | | | |
|---|---|---|---|
| 4,815,902 A | 3/1989 | Durfee, Jr. | |
| 5,211,635 A | 5/1993 | Omi et al. | |
| 5,609,446 A | 3/1997 | Link et al. | |
| 8,142,115 B2 | 3/2012 | Reinhardt et al. | |
| 8,469,642 B1 | 6/2013 | Garrick et al. | |
| 2002/0041798 A1* | 4/2002 | Karlsson ............... | B23B 51/108 |
| | | | 408/230 |
| 2008/0232915 A1 | 9/2008 | Reinhardt et al. | |

FOREIGN PATENT DOCUMENTS

| | | | |
|---|---|---|---|
| CN | 106735462 A | | 5/2017 |
| CN | 206747655 U | | 12/2017 |
| DE | 4320830 A1 | | 1/1994 |
| DE | 4120436 A1 | | 3/1994 |
| DE | 102017210986 A1 | | 1/2019 |
| EP | 0519233 A1 | | 12/1992 |
| EP | 0684099 A1 | | 11/1995 |
| FR | 954456 A | | 12/1949 |
| FR | 2298406 A1 | | 8/1976 |
| JP | S6112623 U | * | 1/1986 |
| JP | 04053613 A | * | 2/1992 |
| JP | H0553818 U | * | 7/1993 |
| JP | 2006082144 A | * | 3/2006 |
| KR | 20110042480 A | * | 4/2011 |
| WO | WO1987000100 | | 1/1987 |
| WO | 2006060204 A2 | | 6/2006 |
| WO | 2017088270 A1 | | 6/2017 |

OTHER PUBLICATIONS

International Search Report and Written Opinion corresponding to PCT/US2020/022647, mailed Jul. 6, 2020, 8 pages.
Sep. 12, 2023 Foreign Office Action Chinese Application No. CN202080018625.4, 13 pages.
European Office Communication for Application No. 20774494.7, mailed on Nov. 15, 2022, 1 page.
Extended European Search Report for European Application No. 20774494.7, mailed Oct. 27, 2022, 9 Pages.
Apr. 12, 2023 Foreign Office Action Chinese Application No. CN202080018625.4, 18 Pages.
Oct. 23, 2021 EPO Notification R161(1) & R. 162 EP App. No. 20774494.7.
Sep. 16, 2021 International preliminary report on patentability received WO App. No. 190726.
Aug. 28, 2019 Office Action (non-US) DE App. No. 102019203531.
Feb. 2, 2024 Foreign Office Action Chinese Application No. CN202080018625.4, 17 Pages.

* cited by examiner

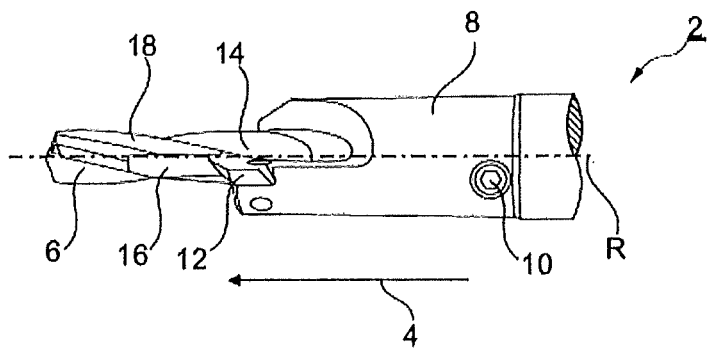
Fig. 1
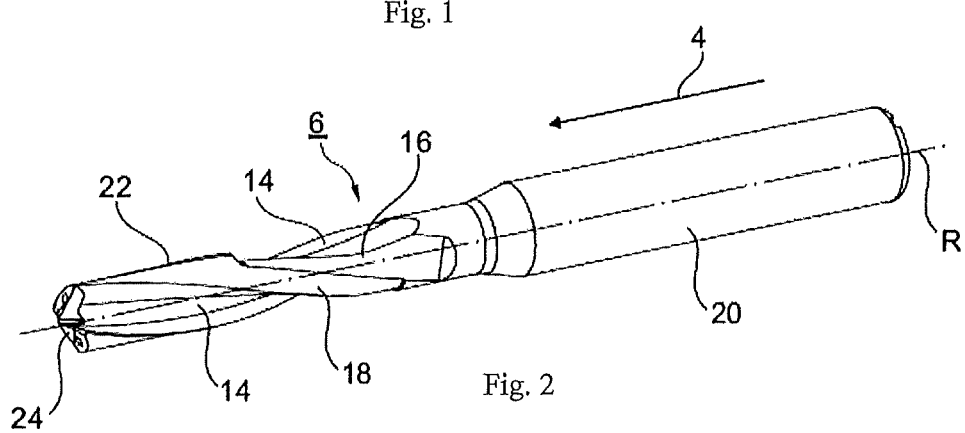
Fig. 2
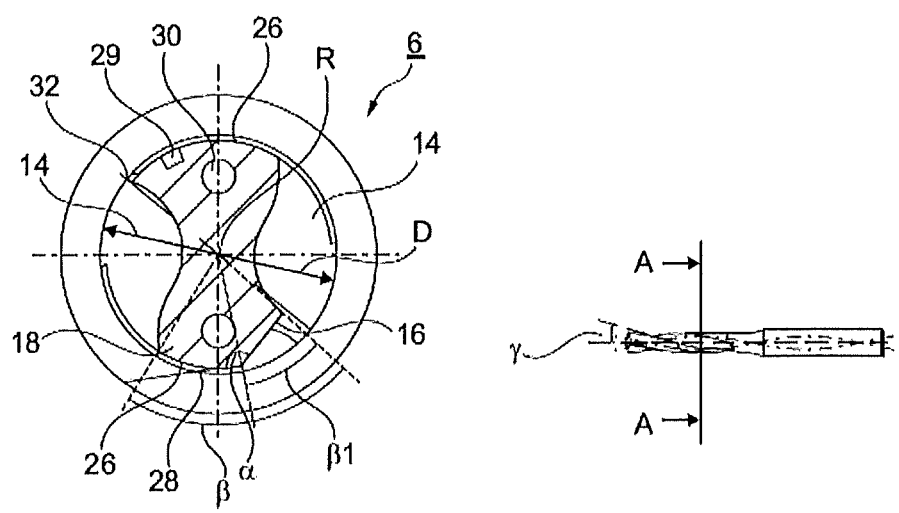
Fig. 3A
Fig. 3B

COMBINATION TOOL AS WELL AS DRILLS FOR SUCH A DRILLING/CHAMFERING TOOL

RELATED APPLICATION DATA

The present application is a U.S. National Phase of PCT/US2020/022647, filed Mar. 13, 2020, which claims priority to German patent application number 102019203531.0, filed Mar. 15, 2019, each of which are incorporated herein by reference in their entireties.

FIELD

The invention relates to a combination tool, in particular a drilling/chamfering tool, with a drill extending in a longitudinal direction along a rotational axis and with a clamping sleeve, which is designed to receive the drill and fasten the drill with variable length and which has a holding seat for a cutting insert, wherein the drill has a cutting region provided with grooves and the grooves extend helically at a twist angle, wherein drill backs extending helically with a curved peripheral surface are formed between two grooves and one of the drill backs is partially flattened to form a flat adjustment surface for the cutting insert. The invention also relates to such a drill for such a combination tool.

BACKGROUND

In the present invention, a "combination tool" refers to a combined tool, which consists of a drill and an additional cutting insert which is arranged on the periphery of the drill and which is, for example, a chamfering insert, a countersinking insert, or a reaming insert or the like. In the combination tool, a length adjustment is provided so that for the machining operation, the distance between a drill cutting edge of the drill and a cutting edge of the cutting insert in the longitudinal direction is variably adjustable. In this case, "adjustable" in particular refers to an adjustability in the longitudinal direction of at least half a nominal diameter of the drill.

Such a drilling/chamfering tool as well as such a drill can be found in U.S. Pat. No. 8,142,115B2. In the tool known therefrom, the adjustment surface extends in parallel to the longitudinal direction and allows a variable length adjustment and fastening of the drill within the clamping sleeve.

Such a drilling/chamfering tool is used to drill a drill hole and at the same time to form a chamfer or to countersink the drill hole formed in one work process. For example, the chamfered or countersunk region is used to receive a screw head of a screw or to receive a rivet head.

The variable length adjustment of the clamping sleeve, to which the cutting insert is attached, allows the same tool to be used for different applications and specifically for different drill hole depths.

In the previously described drilling/chamfering tool, the adjustment surface on the drill is used for example, however not necessarily, for abutment of the cutting insert. As a result of the flattening, the cutting edge of the cutting insert can be guided radially further toward the center. However, only limited length adjustment is possible.

SUMMARY

Proceeding therefrom, the invention is based on the task of specifying a combination tool and a drill for such a combination tool in which a length adjustment over a largest possible range is made possible.

The task is achieved according to the invention by means of a combination tool, in particular a drilling/chamfering tool, with a drill extending in a longitudinal direction along a rotational axis and with a clamping sleeve which is designed to receive the drill and to fasten the drill with variable length. The clamping sleeve has a holding seat for a cutting insert, for example a chamfering tool. The drill comprises a cutting region provided with grooves, wherein the grooves extend helically at a twist angle. Between two adjacent grooves, a drill back extending helically with a curved peripheral surface is respectively formed. At least one, alternatively several or all of the drill backs is/are partially flattened so that an adjustment surface is formed. The adjustment surface extends helically, i.e., also at a twist angle. This is understood to mean that a boundary line, i.e., a lateral delimiting line of the surface, extends helically and thus along a helix.

The term "partially" is understood to mean that the flattening extends at least over a length subregion of the drill back.

The term "flattened" is generally understood to mean that the distance, particularly when viewed in a cross-section perpendicular to the rotational axis, of (each) point on the adjustment surface to the rotational axis is less than the distance from the drill back, in particular from the curved peripheral line of the drill back, to the rotational axis.

The cutting insert has a side surface which faces the adjustment surface in the assembled state. For example, this side surface is an abutment surface with which the cutting insert abuts against the adjustment surface in the assembled state. Preferably, a gap between the cutting insert, i.e., this side surface, and the adjustment surface is formed in the assembled state. For an exact alignment of the cutting insert, in particular in this case, a defined abutment contour or abutment surface for the cutting insert is formed on the clamping sleeve. This abutment surface on the clamping sleeve preferably extends in parallel to a tool longitudinal axis and thus in parallel to the rotational axis. Alternatively, it is aligned at an angle to the rotational axis.

The side surface of the cutting insert, which is oriented toward the adjustment surface, preferably extends, when viewed in the cross-section perpendicular to the rotational axis, in parallel to the adjustment surface and is designed in particular as a planar surface.

The adjustment surface is preferably designed to extend linearly when also viewed in the cross-section perpendicular to the rotational axis. Alternatively, it is curved.

The cutting insert is generally movable along the adjustment surface. In a preferred embodiment, the side or abutment surface of the cutting insert is designed as a planar surface, which extends in parallel to the adjustment surface in the assembled state and abuts against the adjustment surface, for example.

The task is furthermore achieved according to the invention by a drill for a combination tool, in particular for a drilling/chamfering tool, which drill comprises a cutting insert provided with grooves, wherein the grooves extend helically at a twist angle and drill backs extending helically with a curved peripheral surface are formed between two grooves, wherein one of the drill backs is partially flattened to form a flat adjustment surface which extends helically.

The twist angle of the grooves is an angle not equal to zero. Typically, the twist angle is >5°, and further preferably >10°, and often in the range between 25 and 45°.

The special advantage of the adjustment surface extending helically can be seen in that, in comparison to an adjustment surface oriented in parallel to the longitudinal direction, the adjustment surface can be designed to be considerably longer overall when viewed in the longitudinal direction so that a largest possible length range over which a length adjustment is possible is created. This in particular also provides the advantage that comparatively large, even conventional twist angles, can be used for the grooves, and at the same time a sufficiently large axial adjustment range is still created.

In the design known from the prior art, the twist angle limits the adjustment range. For a sufficient adjustment range, a special, very low twist angle of the grooves is required in the known design.

It is expediently provided that the adjustment surface extends at the same twist angle as the grooves. The adjustment surface therefore extends virtually in parallel to the grooves. It specifically has a constant width over its entire length. Alternatively, the adjustment surface has a different twist angle than the grooves. For example, the adjustment surface is introduced by a subsequent grinding process.

In a preferred embodiment, the adjustment surface tapers off into one of the grooves. It specifically tapers off into the leading groove. The leading groove is the groove which is arranged before the drill back in an intended direction of rotation during operation. When viewed in the peripheral direction, the adjustment surface therefore has a radially inner end which tapers off into the leading groove. As a result, the cutting insert and a cutting edge thereof can generally also extend to some extent into the groove.

As already mentioned above, the adjustment surface is created in particular by grinding the otherwise curved drill back. In doing so, only one subregion of the drill back is ground starting from the leading groove when viewed in the peripheral direction. When viewed in the peripheral direction, a conventional, rounded region of the drill back therefore still adjoins the flattened region. The flattened region, which forms the adjustment surface, thus covers, when viewed in a cross-section, only a part of the entire predetermined angle range of the drill back. For example, it covers at least 25% and, for example, 30% to 60% of the entire angle range of the drill back. For example, the entire angle range covered by the drill back in an embodiment of the drill with two grooves is typically in the range between 80° and 120°, depending on the design of the grooves. The flattened adjustment surface therefore typically covers an angle range between a total of 30° and 60°.

The adjustment surface furthermore has an orientation that is selected in such a way that it encloses a preferably obtuse angle with the curved peripheral surface when viewed in cross-section, which angle is in particular in the range of 80° or 90° to 160° and especially in the range from 115° to 145°. The angle is measured in this case as an internal angle between the adjustment surface and a tangent of the curved peripheral surface at the point where the adjustment surface meets the curved peripheral surface.

Due to the selected obtuse angle, a surface normal of the adjustment surface is therefore oriented at an angle of inclination to the radial direction. As a result, a width of the adjustment surface is overall selected to be as large as possible.

The adjustment surface extends in the longitudinal direction and comprises a front end which is oriented toward a drill tip of the drill and at which the adjustment surface transitions in particular via a step into the curved peripheral surface.

The adjustment surface furthermore extends in the longitudinal direction over a length, which is preferably a multiple of a nominal diameter of the drill. For example, the length is at least two times and, for example, more than three or more than four times the nominal diameter. In principle, there is the possibility of introducing the adjustment surface into the drill back up to the drill tip or to almost a drill tip. In order to ensure a reliable drilling result, the adjustment surface ends at least one, preferably at least two, nominal diameters before the drill tip. However, the adjustment surface is preferably at most 70% of the total length of the cutting region. The term "cutting region" is understood to mean the region of the drill provided with the grooves.

The term "drill tip" refers in the present invention to a front face of the drill in which the main blades for the drilling process are formed. The nominal diameter is double the distance of a radially outermost cutting corner of the respective main blade to the rotational axis of the drill.

In an advantageous development, the twist angle is selected to be >5° and in particular >20° and is in particular in the range from 20° to 45°. Conventional twist angles that are favorable for efficient chip transport are thus used. At the same time, a largest possible adjustment length is achieved.

In addition to an axial movement of the clamping sleeve along the drill in the longitudinal direction, the length adjustment generally also requires a rotational movement of the clamping sleeve so that the cutting insert attached to the clamping sleeve is oriented in a defined angular position to the adjustment surface.

According to a first design variant, free rotatability of the clamping sleeve is provided. The clamping sleeve itself can therefore be freely rotated about the drill in this design variant. If the cutting insert is attached in the holding seat of the clamping sleeve, a certain guidance is usually provided via the cutting insert since it has an abutment side which extends in parallel to the adjustment surface and abuts against it or is only slightly spaced apart from it. In order to avoid a collision of the cutting insert and in particular of this abutment side with a rounded section of the drill back, rotating the clamping sleeve about the rotational axis, namely in particular in accordance with the twist angle of the adjustment surface, is therefore necessary.

In an advantageous development, forced guidance between the drill and the clamping sleeve as opposed to free adjustability is provided with the help of a guide element. This means that the drill and the clamping sleeve are mechanically forcibly guided together by the guide element in such a way that in the case of a length adjustment of the clamping sleeve relative to the drill, a rotational movement of the clamping sleeve about the rotational axis and thus about the drill is carried out. This is done in particular by a guide groove in which a corresponding guide pin engages. Preferably, the guide groove is formed on the drill and the guide pin is formed on an inside of the clamping sleeve. In this case, the guide groove expediently extends helically again, namely in particular at the same twist angle as the adjustment surface.

In a preferred embodiment, the guide element, i.e., in particular the guide groove, is also formed on one of the drill backs of the drill. This can in principle be the drill back on which the adjustment surface is formed. However, it is preferably a further drill back on which no adjustment surface is formed.

Overall, the adjustment surface is formed only on one drill back. The guide element is expediently only formed on one drill back.

For the clamping and fastening of the drill in the clamping sleeve, the clamping sleeve is designed, for example, in the manner of an expansion chuck, or comprises a particularly radial fastening element, such as a clamping screw. In a preferred embodiment, it has a slotted sleeve shaft, which is designed to be received into a tool holder, wherein a clamping force is exerted via the tool holder. Specifically, a clamping sleeve as described in DE 102017210986A1 is used.

BRIEF DESCRIPTION OF THE DRAWINGS

Exemplary embodiments of the invention are explained in greater detail below on the basis of the figures. These figures partially show simplified illustrations:

FIG. 1 a side view of a drilling/chamfering tool according to the prior art,

FIG. 2 a perspective illustration of a drill according to the invention,

FIG. 3A a sectional view of a cross-section through the drill along the section line A-A according to FIG. 3B, FIG. 3B a side view of the drill according to the invention, FIG. 4 a perspective illustration of a clamping sleeve for receiving and fastening the drill.

DETAILED DESCRIPTION

Figure 4:
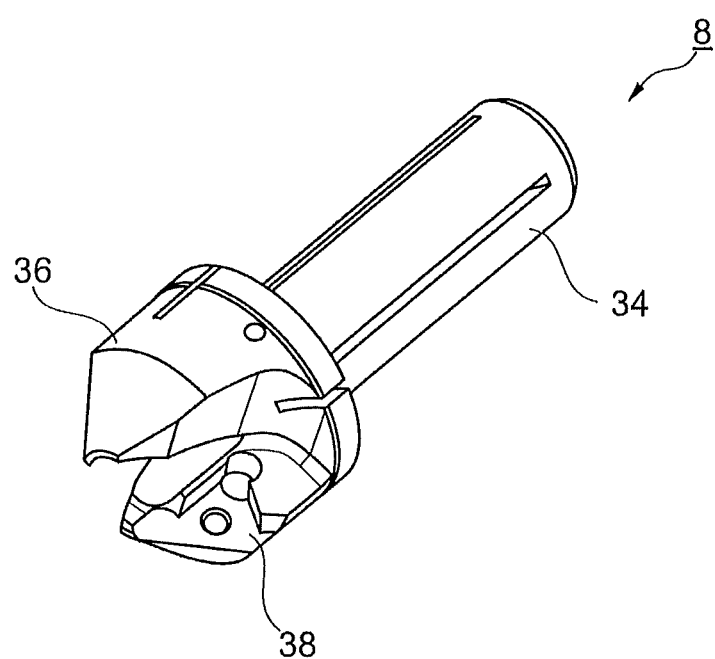

The combination tool 2 shown in FIG. 1 is designed as a drilling/chamfering tool. It extends in the longitudinal direction 4 along a rotational axis R. The combination tool comprises a drill 6 extending in the longitudinal direction 4 and a clamping sleeve 8. The clamping sleeve 8 serves to receive and fasten, i.e., to secure the drill 6 at a defined length position. In the prior art, a variable length adjustment and fastening of the drill 6 is made possible. The clamping is carried out by means of a radial clamping screw 10, for example. On its front end, the clamping sleeve furthermore comprises a cutting insert 12 designed as a chamfering tool with a cutting edge. In the exemplary embodiment, the cutting edge is inclined obliquely to the longitudinal direction 4 or alternatively oriented perpendicularly thereto. It serves to form a chamfer/bevel or even a broadened countersunk hole at the end of a drilled hole formed using the drill 6. The cutting insert 12 comprises an abutment side (not described in more detail) extending in parallel to the longitudinal direction and thus also in parallel to the adjustment surface 16. The cutting insert 12 is arranged in a holding seat 38 (cf. FIG. 4 in this respect).

The drill 6 is a grooved drill 6, i.e., a drill provided with grooves 14. Specifically, two grooves are provided, which are designed to extend helically at a twist angle γ (cf. FIG. 3B in this respect). An adjustment surface 16 can also be seen. Said adjustment surface in the drill shown in FIG. 1 extends according to the prior art in parallel to the longitudinal direction 4. It is incorporated into one of the drill backs 18, which are formed between the grooves 14.

FIG. 2 shows a drill 6 according to the invention. It also extends in the longitudinal direction 4 and comprises a rear shaft region 20, which is adjoined by a cutting region 22 provided with the grooves 14. On its front end, the drill has a drill tip 24. Thereon are formed the main blades for the drilling process. Starting from the front-side main blades, the grooves 14 extend over the length of the cutting region.

In the drill according to the invention, an adjustment surface 16 is also designed as a flattened partial surface of the drill back 18. In the drill 6 according to the invention, the adjustment surface 16 extends helically, namely in particular at the same twist angle γ at which the grooves 14 are also oriented. The twist angle γ is determined here by the inclination/orientation of the groove or a lateral delimiting line of the adjustment surface to the longitudinal direction 4 as viewed in a side view (cf. FIG. 3B in this respect).

The adjustment surface 16 is designed to be flat. This is in particular understood to mean that it is spanned at each point of its surface by two linear vectors, wherein one vector extends in parallel to the longitudinal direction 4 and the other extends perpendicularly to the longitudinal direction 4. In general, the adjustment surface is designed in the manner of a helical flat side. It has no curvature, especially no convexly curved surface regions, in contrast to the normal drill back 18.

The adjustment surface 16 starts in particular at the rear end of the drill back 18 and extends in the longitudinal direction 4 preferably via a large subregion of the cutting region 20. For example, the adjustment surface 16 extends over 30% to 70% of the length of the cutting region 20; in the exemplary embodiment, the adjustment surface 16 extends approximately over 50% of the length of the cutting region 22.

The adjustment surface 16 has a preferably constant width or at least an approximately constant width over its entire length. This means that both its lateral delimiting boundary lines extend in parallel to one another.

The adjustment surface 16 is formed in particular by grinding one of the two drill backs 18. The position and orientation of the adjustment surface 16 arises in particular from FIG. 3A. As can be seen therefrom, the adjustment surface 16 on the one side tapers off into the leading groove 14. On its opposite edge, it transitions into a curved peripheral side 26 of the drill back 18. With it, especially with a tangent 28, it encloses an obtuse angle α, which is approximately 135° in the exemplary embodiment.

It can also be seen that the adjustment surface 16 covers an angle range β1, which is approximately half of a total angle range β which is covered by the drill back 18.

In a preferred embodiment, the drill 2 also has a guide groove 29, which is indicated in FIG. 3A by way of example. This guide groove 29 serves a forced guidance for the clamping sleeve 8. The guide groove 29 is introduced into the drill back 18 opposite the drill back 18 into which the adjustment surface 16 is introduced. The guide groove 29 is introduced from outside into the peripheral side 26 and extends helically at the same twist angle γ as the grooves 14. A guide pin not shown here engages in this guide groove 29 and is formed on the inside of the clamping sleeve 8. The guide groove 29 and the guide pin define a forced guidance of the clamping sleeve 8 on the drill 6 so that in a longitudinal movement of the clamping sleeve 8 along the drill 6, the clamping sleeve 8 automatically rotates.

As can also be seen in FIG. 3A, the drill 6 generally also has cooling channels 30, one cooling channel respectively extending in each drill back 18. The cooling channels 30 therefore also extend helically.

Furthermore, it can be seen by means of the sectional view in FIG. 3A that the peripheral side of both drill backs 18 is somewhat radially recessed in comparison to a circle with a drill nominal diameter D.

Both drill backs 18 only have one support chamfer 32 each on the side that is oriented toward the leading groove 14, said support chamfers often provided with a side blade. The nominal diameter D is defined by the main blades on the end of the drill 6.

The support chamfer 32 is removed in the region of the adjustment surface 16 by the same and not present there.

FIG. 4 also shows a preferred clamping sleeve 8. It corresponds to a known clamping sleeve as described in DE 10 2017 210 986 A1. It comprises a rear slotted clamping shaft 34 as well as a front machining head 36, in which the holding seat 38 for receiving the cutting insert 12 is formed. The holding seat 38 is designed to highly accurately receive the cutting insert 12. The arrangement and orientation of the cutting insert 12 and of the cutting edge 13, even with regard to the adjustment surface 16, is analogous to what was described with respect to FIG. 1.

Overall, the clamping sleeve 8 comprises a cylindrical receptacle into which the drill can be inserted with variable length. The clamping sleeve 8 shown in FIG. 4 is received by a tool holder and clamped therein. At the same time, the drill 6 is also clamped via the slotted clamping sleeve.

The invention claimed is:

1. A combination tool comprising a drill extending in a longitudinal direction along a rotational axis (R) and further comprising a clamping sleeve having a cylindrical receptacle, designed to receive the drill and fasten the drill and having a holding seat for a cutting insert, wherein the drill has a cutting region provided with a first groove and a second groove that each extend helically at a twist angle ($\gamma$), wherein a first drill back is formed between the first and second grooves and extends helically with a curved peripheral surface, wherein the first drill back is partially flattened to form an adjustment surface that extends helically,
wherein the drill and the clamping sleeve are forcibly guided together by a guide groove formed on a curved peripheral surface of a second drill back, the guide groove cooperating with the clamping sleeve so that movement of the clamping sleeve in the longitudinal direction causes the clamping sleeve to automatically rotate about the rotational axis (R) in accordance with the twist angle ($\gamma$) of the first and second grooves.

2. The combination tool according to claim 1, wherein the adjustment surface extends at a same twist angle ($\gamma$) as the twist angle ($\gamma$) of the first and second grooves.

3. The combination tool (2) according to claim 1, wherein the adjustment surface tapers off into one of the first and second grooves.

4. The combination tool according to claim 1, wherein at least one of the first and second drill backs covers a predetermined angle range ($\beta$) between the first and second grooves, wherein the adjustment surface covers at least one quarter of the predetermined angle range ($\beta 1$).

5. The combination tool according to claim 1, wherein the adjustment surface encloses with the curved peripheral surface an angle ($\alpha$) in the range from 80° to 160° when viewed in cross-section.

6. The combination tool according to claim 1, wherein the adjustment surface extends in the longitudinal direction and comprises a front end, where the adjustment surface transitions via a step into the curved peripheral surface.

7. The combination tool according to claim 1, wherein the adjustment surface extends in the longitudinal direction over a length that is at least two times a nominal diameter of the drill.

8. The combination tool according to claim 1, wherein the twist angle ($\gamma$) is greater than 5°.

9. A drill for a combination tool, comprising:
a cutting region provided with a first groove and a second groove that each extend helically at a twist angle ($\gamma$), wherein a first drill back is formed between the first and second grooves and extends helically with a curved peripheral surface, wherein the first drill back is partially flattened to form an adjustment surface that extends helically,
wherein the drill is adapted to be received in a cylindrical receptacle of a clamping sleeve, the clamping sleeve a holding seat for a cutting insert, and
wherein the drill and the clamping sleeve are forcibly guided together by a guide groove formed on a curved peripheral surface of a second drill back, the guide groove cooperating with the clamping sleeve so that movement of the clamping sleeve in the longitudinal direction causes the clamping sleeve to automatically rotate about the rotational axis (R) in accordance with the twist angle ($\gamma$) of the first and second grooves.

10. The drill according to claim 9, wherein the drill is a chamfering tool.

11. The combination tool according to claim 1, wherein the combination tool is a chamfering tool.

12. The combination tool according to claim 5, wherein the angle ($\alpha$) is in the range of 115° to 145°.

13. The combination tool according to claim 8, wherein the twist angle ($\gamma$) is in the range from 20° to 45°.

* * * * *